US009500019B2

(12) United States Patent
Haab et al.

(10) Patent No.: US 9,500,019 B2
(45) Date of Patent: Nov. 22, 2016

(54) METHOD FOR OPERATING A SYSTEM WITH FOLDABLE ELEMENTS AND SYSTEM WITH FOLDABLE ELEMENTS

(71) Applicant: HAWA AG, Mettmenstetten (CH)

(72) Inventors: Gregor Haab, Allenwinden (CH); Peter Ettmuller, Jonen (CH); Werner Kollbrunner, Obfelden (CH); Nejib Yezza, Rickenbach b. Schwyz (CH)

(73) Assignee: HAWA AG, Mettmenstetten (CH)

( * ) Notice: Subject to any disclaimer, the term of this patent is extended or adjusted under 35 U.S.C. 154(b) by 466 days.

(21) Appl. No.: 13/857,464

(22) Filed: Apr. 5, 2013

(65) Prior Publication Data

US 2013/0276373 A1 Oct. 24, 2013

(30) Foreign Application Priority Data

Apr. 20, 2012 (EP) .................................... 12164985

(51) Int. Cl.
*G05B 5/00* (2006.01)
*E05F 15/10* (2006.01)
(Continued)

(52) U.S. Cl.
CPC ............. *E05F 15/103* (2013.01); *E05D 15/26* (2013.01); *E05F 15/60* (2015.01); *E05F 15/603* (2015.01); *E05F 15/605* (2015.01); *E05F 15/70* (2015.01); *E05Y 2400/456* (2013.01);
(Continued)

(58) Field of Classification Search
USPC ........... 318/3, 476, 266, 430, 466, 445, 468, 318/474, 469, 471, 432; 49/324, 29, 199, 49/177, 128, 275, 358, 127; 340/5.7, 5.23, 340/5.22, 5.26, 5.64, 5.71; 16/96 R
See application file for complete search history.

(56) References Cited

U.S. PATENT DOCUMENTS 5,770,934 A * 6/1998 Theile .................. H02H 7/0851 318/466
5,789,887 A * 8/1998 Elischewski ....... G05B 19/0428 318/286

(Continued)

FOREIGN PATENT DOCUMENTS

| | | | |
|---|---|---|---|
| DE | 196 01 359 | A1 | 7/1997 |
| EP | 1 160 409 | A2 | 12/2001 |
| WO | WO 2007/105057 | A2 | 9/2007 |

OTHER PUBLICATIONS

Hawa AG, "Baubeschlage fur Schiebeladen" ("Structural fittings for folding sliding shutters"), 2006, p. 36.

(Continued)

*Primary Examiner* — Jorge L Carrasquillo
(74) *Attorney, Agent, or Firm* — Oliff PLC

(57) ABSTRACT

The method serves for operating a system with a foldable element that is provided with a control unit including at least two foldable elements, that are connected each via connecting shafts to related carriages, which are slidably supported in a running rail and of which at least the carriage connected to the front-sided foldable element is provided with a drive motor, the method including the step of executing a learning drive, with which the system with foldable elements is transferred from at least a first into a second position and related information is captured. According to the invention at least at the front-sided carriage data of the acting load and related position data are captured and therefrom status data of the installed system with foldable elements are determined and provided to an operating program, that controls the at least one drive motor depending on to the determined status data.

15 Claims, 11 Drawing Sheets

(51) Int. Cl.

| | |
|---|---|
| ***E05D 15/26*** | (2006.01) |
| ***E05F 15/60*** | (2015.01) |
| ***E05F 15/603*** | (2015.01) |
| ***E05F 15/605*** | (2015.01) |
| ***E05F 15/70*** | (2015.01) |

(52) U.S. Cl.

CPC ..... *E05Y 2800/00* (2013.01); *E05Y 2800/176* (2013.01); *E05Y 2900/00* (2013.01); *E05Y 2900/142* (2013.01); *E05Y 2900/146* (2013.01)

(56) References Cited

U.S. PATENT DOCUMENTS

| | | | | |
|---|---|---|---|---|
| 6,005,361 | A * | 12/1999 | Grinewitschus | H02H 7/0851 318/430 |
| 6,034,497 | A * | 3/2000 | Tamagawa | H02H 7/0851 318/266 |
| 6,286,258 | B1 | 9/2001 | Bischof et al. | |
| 7,173,389 | B1 * | 2/2007 | Gagnon | H02H 7/0851 318/280 |
| 8,122,645 | B2 * | 2/2012 | Theile et al. | 49/324 |
| 2004/0124801 | A1 * | 7/2004 | Jurado et al. | 318/476 |
| 2004/0160205 | A1 * | 8/2004 | Robb et al. | 318/468 |
| 2006/0026520 | A1 * | 2/2006 | Gregori | G05B 19/0426 715/701 |
| 2009/0115366 | A1 * | 5/2009 | Mullet | E05F 15/668 318/466 |
| 2010/0154174 | A1 * | 6/2010 | Haab | E05D 15/0604 16/96 R |
| 2013/0127590 | A1 * | 5/2013 | Braverman et al. | 340/5.7 |

OTHER PUBLICATIONS

Der Atmel Corporation, "AVR443: Sensor-based control of three phase Brushless DC motor," Rev. 2596B-AVR-02/06, pp. 1-6.

Sep. 25, 2012 Search Report issued in European Patent Application No. 12164985.9.

* cited by examiner

METHOD FOR OPERATING A SYSTEM WITH FOLDABLE ELEMENTS AND SYSTEM WITH FOLDABLE ELEMENTS

The invention relates to a method for operating a system with foldable elements, particularly to a method for operating a foldable sliding wall, and to a system with foldable elements.

In order to separate or form rooms or room areas, for closing room openings or window openings and for covering fronts or facades often wall elements, such as sliding doors are used, which are mounted, possibly rotatably mounted, on carriages that are displaceable along a rail. Sliding doors of this kind are made for example from transparent glass, wood or metal. Often, the wall elements are coupled with one another, so that the combination of all elements forms a foldable sliding wall or a folding sliding shutter. Individual wall elements or a plurality of wall elements combined with one another are also used in furniture units, particularly in wardrobes.

In [1], U.S. Pat. No. 6,286,258B1 (WO 97/49885), a movable wall is disclosed that comprises two sets of running rails, along which the wall elements can be moved into a parking region. The running rails comprise a branch in the parking region, from which a straight rail element and a bent rail element are leaving. The wall elements are suspended on two carriages, of which one is guided into the straight rail element and the other into the bent rail element. By this, the wall elements are turned by 90° and for example parked aligned in parallel to one another on a wall. Hence, for turning the wall elements a dedicated rail system is required, which possibly needs to be adapted to the local conditions.

From [2], product catalogue of HAWA AG, "Baubeschläge fÜr Faltschiebeläden" ["Structural fittings for folding sliding shutters"], 2006, page 36, discloses a fitting for folding sliding shutters having an even or uneven number of wings, is known, which are installed for example on a window front or on the outer side of a balcony. The wing elements of the folding assembly are pivotally connected with one another by means of hinges. Such a folding assembly can be pushed laterally against a wall or used free standing as a light shield or wind shield. The displacement, opening or folding of the folding assembly, is realised without an additional rail element through manual intervention. The wing elements are thereby normally rotated at unequal speeds with the result that irregular folding processes arise in dependence upon the manual intervention.

From [3], US2010154174A1 (EP2199514B1), a foldable sliding wall is known which comprises motorised carriages that are mounted on the front first wall element and on each following wall pair of wall elements. The motors of the carriages are thereby controlled in such a manner, that they travel with the required speed along the rail. Further, the motors are coupled with a drive element with which, the pivotally held wall elements can be driven, so that a wall element held by the carriage is not only moved with the required speed along the rail, but can also be turned, in order to perform the parking procedure. This device requires a plurality of motorised carriages, which comprise an extended drive mechanism and a control circuitry that is of according complexity. In order to open and close the foldable sliding wall the drive devices of the individual carriages are programmed or controlled accordingly. The required control data are calculated based on the configuration data of the foldable sliding wall.

Further, when moving slidable doors strict safety requirements must be adhered to, so that corresponding measures are taken in the event that obstacles appear.

From [4], U.S. Pat. No. 6,005,361A (DE19601359A1), it is known to compare the motor current that is supplied to a direct-current drive device with a given threshold or with captured reference values. For this purpose, the parameters of the direct-current drive device and the parameters of the driven element are determined and stored during a learning drive. During the later use of the foldable sliding wall, disturbances can be detected by monitoring the occurrence of deviations with the stored parameter values.

The method known from [4] can be implemented for example in the foldable sliding wall known from [3]. In a first step the foldable sliding wall is programmed and in a further step the undisturbed learning drive with capturing of the parameters of the direct-current drive device is performed. In the event that after the installation at the user's site the foldable sliding wall collides with an obstacle, then the direct-current drive or the foldable sliding wall, respectively, can be stopped and retracted. For example, the contact with an end stop can be detected, so that the direct-current drive can be switched off after the motor current has risen correspondingly. For this purpose, a collision with the end stop is required, which typically causes noise and stress on assembly parts of the device.

For a foldable sliding wall that is always produced, delivered and installed at the user's site in the same configuration, an operating program is provided by the manufacturer, which provides a desired comfort of operation. However, if the configuration of the foldable sliding wall deviates from a given standard, specific programming is required, which needs to be done individually at the user's site with corresponding effort. For this purpose, installation guides written in the languages of the users or training courses need to be provided. Normally, the presence of a trained professional is required, for which reason cost and duration of installation can be considerable.

It is further to be noticed that known foldable sliding walls, such as the foldable sliding wall known from [3], comprise a plurality of motors, for which reason on the one hand considerable material costs and on the other hand considerable efforts for programming the control procedures for the individual motors results.

In the event that the defects occur on the foldable sliding wall, these defects may not be recognised at an early stage, so that for the operation of the foldable sliding wall more energy will be used and device parts may wear off and must be replaced earlier.

The present invention is therefore based on the object of creating an improved method for operating a system with foldable elements, particularly a method for operating a foldable sliding wall, as well as an improved system with foldable elements, particularly an improved foldable sliding wall.

It shall be possible to deliver and install the inventive system with minimal efforts. In particular, work for programming the system shall preferably be avoided completely.

The installation services provider shall no longer be burdened with the task of obtaining status data, including configuration data of the system.

Further, it shall be possible to localise defects of the system, preferably by remote maintenance, with simple measures.

It shall be possible to sequentially fold the elements of the system, so that only the foldable elements can be turned and parked, which are not required, while the required foldable elements remain fully functional.

Further, in a preferred embodiment the system with foldable elements shall be operable in such a manner that parts of the opening, which are closable by the system, shall selectively be closable by specific elements of the system.

This object is achieved with a method for operating a system with foldable elements and a system with foldable elements, which exhibit the features defined in claims 1 and 14 respectively. Preferred embodiments of the invention are defined in further claims.

The method serves for operating a system with foldable elements that is provided with a control unit, particularly a foldable sliding wall, that comprises at least two foldable elements, that are connected each via connecting shafts to related carriages, which are slidably supported in a running rail and of which at least the carriage connected to the front-sided foldable element is provided with a drive motor. The method comprises the step of executing a learning drive, with which the system with foldable elements is transferred from at least a first into a second position and related information is captured. The system with foldable elements can be any system with elements that are, connected with one another, guided in a rail and are foldable against one another.

According to the invention at least at the front-sided carriage data of the acting load and related position data are captured and therefrom, status data, including configuration data of the installed system with foldable elements are determined and provided to an operating program, that controls or regulates respectively the at least one drive motor depending on to the determined status data.

In a preferred embodiment changes of the acting load and/or at least parts of the profile of the acting load are captured and analysed and therefrom reference values for a self-learning control system are determined, with which the at least one drive motor is controlled depending on the initially determined status data and depending on the currently captured actual data.

During normal operation of the system with foldable elements currently captured actual data are recorded during operation and are compared with the initially determined status data and therefrom deviations are determined. Depending on the determined deviations values for controlling and/or regulating of the at least one drive motor are formed. Preferably, depending on the determined deviations reference values are continuously adapted so that a system is reached that corresponds to the standards and that is optimally controlled.

After the installation of the system with foldable elements the control unit executes, initialised automatically or manually, a learning drive and stores data obtained thereby in a buffered memory, e.g. a read-only memory (ROM). Only then, a switch over into the operational mode takes place. The use of a buffered memory ensures that the stored data do not get lost during longer periods without current supply and thus no new learning drive needs to be executed. Preferably, the running time, the operation time, the number of learning drives and the running distance of the system with foldable elements, are continuously measured and periodically stored. Based on the determined data, maintenance predictions can be calculated and, if appropriate, service requests can be transferred over a wireless or wired network or can be signalled on a display unit.

The inventive method allows the producer to configure foldable sliding walls individually according to the requirement of the client without an increase of installation efforts.

Systems with foldable elements can be equipped with foldable elements in any number and with any dimensions. The system with foldable elements can be attached to the one or the other side of an opening that needs closing and can therefore be closed or opened in the one or the other direction. It is also possible to integrate actuators that serve as selectable intermediate stops and can be operated in any known manner.

With the inventive method the system with foldable elements can automatically be programmed independently of the chosen configuration. For this purpose, status data are automatically determined that serve as input values for an operating program, which executes all desired functions. In total, reduced installation efforts result in comparison to conventional foldable sliding walls.

Based on the determined information, such as the direction of opening and closing of the system with foldable elements, the number, the mass and/or the dimensions of the foldable elements, and preferably under consideration of the given technical standards, a self-configuration of the control and regulating system is performed. For example, the maximum motor current is automatically determined that occurs when the maximum allowable force is exceeded, that is allowed to act on an obstacle.

The control unit therefore recognises automatically, in which direction the system with foldable elements is opened, respectively parked, or closed, so that the related configuration data can be coupled with command elements of the device. The control data, which relate to the opening procedure, are assigned to the element of the input device, e.g. the field "OPEN" of the menu structure, so that when this element is selected the system with foldable elements is automatically opened. Further, by suitable programming the option can be provided that allows the user to select a specific number of foldable elements to be driven into or out of the parking area.

The control unit comprises an elementary program, which allows initialising and controlling learning drives, collecting data and determining information that is required for the later operation of the system with foldable elements. By the execution of learning drives, a delivered and installed system with foldable elements can configure itself without support of personnel. In addition users can input additional parameters that shall be taken into account during the later operation of the system with foldable elements. For example, the maximum driving speeds can be set. Further, the user can define several operational configurations, which the system with foldable elements can adopt. For example, the system with foldable elements shall controllable to close or open completely in two first operational configurations. In a further operational configuration a specific number of foldable elements shall be transferable completely. In a further preferred configuration the front-sided foldable element shall be movable to a stop that can selectively be activated. Typically, a learning drive is executed between the end stops only, which delimit the maximum drive distance of the motorised carriage. Hence, with the control unit, configuration data can be determined and electrical devices, particularly the at least one drive unit of the system with foldable elements can be controlled and regulated.

If selectable intermediate stops are provided, then learning drives can be executed up to the intermediate stops. In a first stage the operating program can therefore execute learning drives and then activate an intermediate stop and execute a learning drive up to this intermediate stop.

In preferred embodiments the fact is exploited that learning drives for opening and learning drives for closing the system with foldable elements deliver different information.

When opening the system with foldable elements the load, which requires moving, decreases stepwise with each parking of a foldable element. Thereby the load share disappears, which corresponds to the force that results from the sliding friction of the related carriage. However, preferably it is taken into account that after stopping the carriage the related foldable element is turned, wherefore forces can be registered that result from the impact of wind onto the foldable element.

Normally, the load changes during the process of parking of the foldable elements can precisely be detected, whereafter the corresponding positions, on which the load changes occurred, and the dimensions of the foldable elements can be determined. Further, the loads, which are caused by the sliding friction of the individual carriages, can be determined.

With regular measurement of the forces resulting from sliding friction, occurring disturbances can individually be registered on all carriages and can be reported, wireless or wired, to a service centre. In the event that systems with foldable elements, particularly foldable sliding walls, are installed for example in a hotel, then gathered information can be transferred for example via an Intranet to a maintenance server, in which the statuses of the systems with foldable elements or parts thereof are stored. In the event that, after extended operation of the system, the function of the carriages is impaired or deviations with reference to the data captured during the learning drive are detected, then the maintenance server can issue an error message that precisely specifies the required maintenance work. For example, an error message is issued or sent by e-mail directly to the maintenance personnel, stating that in conference room No. 3 on the system with foldable elements No. 2 the third carriage requires maintenance. In this manner control services can automatically be executed and maintenance work can precisely be planned. Maintenance service can simultaneously monitor a plurality of hotels, company buildings, shopping centres and public houses.

When executing the learning drive, with which the system with foldable elements is closed, additional information can be gained. In this case the foldable elements are driven out of the parking area and must be accelerated unit by unit. The force that is temporarily required for accelerating the foldable elements superimposes the force, which is required to compensate the sliding friction.

For each pair of foldable elements a load profile can therefore be recorded, which comprises a first profile section that corresponds to the load experienced during a linear movement of the pair of foldable elements, and a second profile section, which corresponds to the load experienced during a rotary motion of the pair of foldable elements. From these data, further information relating to the configuration of the system, to the properties and the state of the device parts can be obtained. For example, from the first profile section friction losses and from the second profile section the mass of the foldable elements can be determined. Changes of the state that occur indicate defective device parts, thus facilitating maintenance.

Based on the gained information the system with foldable elements can precisely be operated. Before a foldable element hits a stop, breaking procedures can be calculated precisely under consideration of the mass of the system of foldable elements and the determined positions of the end stops and intermediate stops, so that the system with foldable elements can always be stopped without occurrence of collisions and disturbing noises. Under consideration of the mass of the foldable elements, optimal breaking profiles can be executed, with which needless delays and, at the same time, disturbing noises can be avoided.

Hence, based on the collection of status data, proactive and not only retroactive control of the system with foldable elements can be implemented.

For determining the load, preferably the thereto proportional height of the motor current is measured, which is provided to the drive motor. Preferably a direct-current motor is used that is equipped with integrated Hall sensors and that allows determining, speed, position, direction of rotation of the motor and that can provide these parameters by means of digital signals. Hall sensors of conventional motors typically provide twelve signals per rotation of the motor shaft and therefore for example thousand signals per minute, wherefore an extremely high resolution for position measurement can be reached. In this manner is possible to determine a driven distance as well as the positions of the load changes with precision in the range of a millimeter. The control of brushless direct-current motors by means of Hall sensors is known for example from [5], Application Note Rev. 2596B-AVR-02/06 der Atmel Corporation.

The inventive method can be implemented in a system with foldable elements, which is equipped with one or a plurality of motors, preferably direct-current motors.

In a preferred embodiment, a system with foldable elements operating according to the inventive method comprises a foldable element that is connected torque proof with a related connecting shaft that carries a rotor. The rotor, aligned in parallel to the running rail, is transferable in a rotor channel, which comprises in one or a plurality of regions, in which the foldable elements can be parked, a coupling member with a rotor chamber, in which the rotor is rotatable and is held in position in an alignment perpendicular to the rotor channel.

In a first embodiment the coupling member is formed in one piece on the running rail or on a coupling member body that is connected in one piece to the rail. The coupling member extends along the parking region or along the whole rail.

In a second embodiment the coupling member is formed on a coupling member body that can be inserted into a mounting channel provided within the running rail.

If more than one parking region is provided, a plurality of guide bodies can be provided. As required, the guide bodies can be mounted on both sides or on one or the other side of the rotor channel. This embodiment allows to turning foldable element to the one or the other side and to secure the wall element against movements in the one or the other direction or in both directions. In order to stop the carriage at a parking position, for examples in the mid-range of the running rail, an intermediate stop can be provided that can selectively be activated. If the parking region is located at the end of the running rail, then a firm stop for the front-sided carriage is provided. Preferably the body of the front-sided carriage forms the stop for the next-following carriage. With the control unit, the motorised carriage can, be driven to any position, wherefore intermediate stops are only applied in specific cases, for example for security purposes or upon request of the user.

Below the invention is described with a reference to drawings. Thereby show:

FIG. 1 an inventive system with foldable elements 1 with six foldable elements 11, . . . , 16, and a control unit 9, which controls a motor that is integrated into a carriage;

FIG. 2 a front carriage 5C that is connected to the leading foldable element 16 of the system with foldable elements 1 and that comprises a drive unit 61, which drives a cog wheel 62 that engages in a tooth belt 63 and which is connected with the control unit 9 via power supply lines or data lines 65;

FIG. 3 the system with foldable elements 1 of FIG. 1 with the front carriage 5C of FIG. 2 and a following central carriage 5B, which is connected with two foldable elements 14, 15, between which a protection profile 18 is held;

FIG. 4*a*, 4*b* the system with foldable elements 1 within the parking region, with a running rail (FIG. 4*a*) and without a running rail 2 (FIG. 4*b*), with two folded foldable elements 11, 12 that are held by carriages 5A, 5B that were driven towards one another;

FIG. 5*a*, 5*b* from two sides the carriages 5A, 5B of FIG. 4*b*, which hold each a rotor shaft 711R that is provided with a rotor 712;

FIG. 6 the system with foldable elements 1 of FIG. 4*b* with the partly dismantled central carriage 5*b*, i.e. the remaining rotor shaft 711R and the holding shaft 711H, which are provided each with a holding flange 7111;

FIG. 7 the system with foldable elements 1 of FIG. 6 seen from below with the rotors 712 of the carriages 5A, 5B (removed from the drawing), which are held each in a rotor chamber 81 provided in the rail 2;

FIG. 8 the system with foldable elements 1 with a stabilising rail 3 shown in FIG. 4*b* that comprises a passage 31, through which guide cams 721 can pass with which the foldable elements 11, 12, 13, . . . are firmly held in an alignment parallel to the running rail 2;

FIG. 9 the running rail 2 with a rotor channel 85 and rotor chambers 81;

FIG. 10 a rail 2 with an embedded coupling member body 80;

FIG. 11 a section of an inventive system with foldable elements that merely comprises an end carriage 5A and a front carriage 5*c* that is coupled to the control unit 9;

FIG. 12 a load profile LV recorded when closing the system with foldable elements 1 shown in FIG. 1 with a plurality of load changes Lw1, Lw2, . . . , that always occer when releasing and accelerating the foldable elements 11, 12, . . . ; and FIG. 13 a load profile LV recorded when opening the system with foldable elements 1 shown in FIG. 1 with larger load changes Lw1, Lw2, . . . , that always occur when turning the foldable elements 11, 12, . . . in the parking region.

FIG. 1 shows an inventive system with foldable elements 1 with six foldable elements 11, 12, 13, 14, 15, 16, that are guided on the ceiling side with a running rail 2 and on the floor side with a foot rail 4 and that are stably held on the ceiling side with stabilising rail 3. The foldable elements 11, . . . , 16 form three pairs 11, 12; 13, 14; and 15, 16, between which protection profiles 18 are provided. The foldable elements of each wall pair 11, 12; 13, 14; and 15, 16 are connected with one another on one end through a hinge 19 and on the other end held with carriages 5A, 5B, 5C, that are described below. At the front side and the end side of the system with foldable elements 1 the corresponding foldable elements 11 and 16 are provided each with a terminating profile 18A, 18C, which for example can be moved into a receiving profile.

The system with foldable elements 1 serves for closing an opening, e.g. a wall opening that comprises on both sides an end stop. As described below, between the end stops, intermediate stops can be arranged, at which the foldable elements 11, . . . , 16 can be stopped and, if appropriate, can be parked.

FIG. 1 further shows that the first wall pair of foldable elements 11, 12 is folded and aligned perpendicular to the running rail 2. The process of folding the system with foldable elements is executed sequentially, wall pair by wall pair, in the parking region, while the remaining foldable elements 13, 14, 15, 16 are still aligned in a plane.

The system with foldable elements 1 is driven by means of a drive unit 61, which comprises an electric motor, preferably a direct-current motor that is controlled by the control unit 9. For the operation of the system with foldable elements 1, i.e. for folding and unfolding the foldable elements 11, . . . , 16, the impact of force on the leading foldable element 16 is sufficient, e.g. by means of a motorised carriage 5C as shown in FIG. 2.

FIG. 2 shows the motorised front carriage 5C after the removal of the running rail 2. The front carriage 5C is connected via a connecting shaft or a holding shaft 711H respectively with the leading foldable element 16.

The holding shaft 711H is held by a wall fitting 71, which is mounted at the upper right corner of the foldable element 16. The foldable element 16 is provided on its top with a support bracket 73, which holds a support cam 731 that is guided along the outer side of a stabilising rail 3.

Further, the body 50C of the carriage 5C is provided with carriage wheels 51, 52 and guide wheels 53 and on the lower side with a profile holder 180, which holds a terminating profile 18C. Further, a direct-current motor 61 is integrated into body 50C of the front carriage 5C, which is connected via supply lines and/or data lines 65 with the control unit 9. The supply lines and data lines 65 are guided within a cable chain that follows the front carriage 5*c*. The direct-current motor 61 drives a cog wheel 62, which engages in a toothed belt 63 that is mounted in the rail 2. The direct-current motor 61 preferably comprises a worm gear, with which the cogwheel 62 is blocked when the motor is switched off. Hence, the foldable element 16 that is connected to the front carriage 5C is firmly held after the drive device has been switched off.

FIG. 3 shows the system with foldable elements 1 of FIG. 1 with the front carriage 5C of FIG. 2 and with a subsequent central carriage 5B, which holds two foldable elements 14, 15 and in between a protection profile 18.

The cable chain 64 is guided directly below the toothed belt 63 in a traction channel 26, which is kept free within the running rail 2. For this purpose, the bodies 50A, 50B, 50C of the carriages 5A, 5B, and 5C are provided with corresponding recesses, i.e. with an inverted L-profile. The cable chain 64 is therefore located within the running rail 2 in the traction channel 26, which traverses the carriages 5A, 5B, and 5C. Within the traction channels 26, also the motor 61 and the cog wheel 62, which engages the toothed belt 63, are moved. The complete traction device can therefore be integrated in the running rail 2 with minimal space requirement.

In FIG. 3 it is further shown that the two foldable elements 15 and 16 are connected with one another by a hinge 19 and the foldable elements 14 and 15 are separated from one another by a protection profile 18.

FIGS. 4*a* and 4*b* show a section of the system with foldable elements 1 of FIG. 1 in the parking region with two folded foldable elements 11, 12, which are held by two carriages 5A, 5B that were driven against one another. FIG. 4*a* shows the system with foldable elements 1 with the running rail 2 and FIG. 4*b* shows the system with foldable elements 1 without the running rail 2. While the first two foldable elements 11, are folded, i.e. aligned almost perpendicularly to the running rail 2, the third foldable element 13 is still aligned in parallel to the running rail 2, so that a part of the opening or front remains still perfectly covered. The first and the third foldable element 11, 13 are connected each via a rotor shaft 711R (see FIG. 6) with the related carriage 5A; 5B. On top of each rotor shaft 711R a rotor 712 is arranged, which is firmly coupled via the rotor shaft 711R with the related foldable element 11; 13 and is aligned in parallel thereto. Since the two carriages 5A and 5B have been driven against one another in the parking region, the third foldable element 13 is now ready for turning, i.e. for performing the parking process.

FIGS. 5*a* and 5*b* show from two angles the carriages of FIG. 4*b*, which have been driven against one another, namely an end carriage 5A and a central carriage 5B.

The two carriages 5A, 5B, which comprise a carriage body 50A, 50B each, support a rotor shaft 711R each, which are firmly connected with a wall fitting 71 each. However, only the central carriage 5B, which holds two foldable elements 12, 13, is provided in addition with a holding shaft 711H, that is not equipped with a rotor 712.

The carriage bodies 50A, 50B exhibit the form of an inverted L-profile, with a first vertical profile section 501, a second horizontal profile section 502 and a third vertical profile section 503. The third profile section 503 is provided with a horizontally aligned wheel shaft holding a first carriage wheel 51 and with two vertically aligned wheel shafts holding guide wheels 53. The first profile section 501 is provided with two horizontally aligned wheel shafts holding second carriage wheels 52 and with bores 55 for receiving the rotor shaft 711R and the holding shaft 711H, which also vertically traverse the second profile section 502.

On the upper side of the rotor shaft 711R, which has been inserted into the bore 55 of the carriage body 50A or 50B, a flange element 7111 is provided, which on one side is seated on top of the carriage body 50A or 50B and on the other side is provided with a recess that receives the rotor 712 in a form-locking manner. The holding shaft 711H is preferably identical to the rotor shaft 711R, but not provided with a rotor.

On each front side the rotor 712 is provided with a rotor head 7121, e.g. a gliding element or a roll, which at least in the parking region runs along a coupling member 8 and can be turned out of the rotor channel 85 into the rotor chamber 81 and back, as shown in FIG. 7. Preferably, the rotor 712 is designed symmetrically and can be held in a hollow cylindrical rotor chamber 81. In this way the rotor shaft 711R is always aligned concentrically to the rotor chamber 81. However, since only a part of the rotor 712 is required for locking the related carriage, in principle, also an asymmetrical embodiment of the rotor 712 and the rotor chamber 81 can be provided. The coupling member 8, along which the active rotor head 7121 is guided, is shown in FIG. 7 with a broader line.

The wall fitting 71 comprises a fitting leave 714 that can be screwed to the foldable element 11 or 13 and a fitting lever 713 that is perpendicularly aligned thereto and that is firmly connected to the related rotor shaft 7118 or holding shaft 711H, e.g. by means of screws. Thereby, the fitting leave 714 and the rotor 712 of the related rotor shaft 7118 are aligned in parallel to one another. With the fitting levers 713 the foldable elements 11, . . . , 16 can be held in a desired distance in front of a facade. Furthermore, by means of the fitting levers 713 each, a torque is realised, which acts on the foldable elements 11, . . . , 16 and automatically turns the foldable elements 11, . . . , 16 in the parking region.

The central carriage 5B comprises a profile holder 180 between the rotor shaft 711R and the holding shaft 711H for mounting a protection profile 18 (see FIG. 6), which prevents manual intervention between the ends of the foldable elements 12 and 13. However, the end carriage 5A comprises a profile holder 180 for a terminating profile 18A (see FIG. 6), which can preferably be driven into a receiving profile mounted at the edge and which then overlaps the terminating profile 18A.

FIG. 6 shows the system with foldable elements 1 of FIG. 4*b* from the backside after partially dismantling the central carriage 5B. Only the connecting shafts 711, namely the rotor shaft 711R and the holding shaft 711H, that is identically thereto but not provided with a rotor 712, have remained. The end carriage 5A is individually shown, which comprises a rotor shaft 711R only but not a holding shaft.

FIG. 7 shows the system with foldable elements 1 of FIG. 6 from below with the rotors 712 of the carriages 5A, 5B held each in a rotor chamber 81 of the running rail 2. It is shown, that the rotors 712 are aligned in parallel to the related foldable elements 11 and 13 respectively.

The rotor 712 of the end carriage 5A held in the rotor chamber 81 is aligned perpendicularly to the rotor channel 85 and can therefore not enter the rotor channel 85. The end carriage 5A is therefore blocked and can only be moved, when the related first foldable element 11 is turned by 90° and aligned in parallel to the running rail 2.

However, the rotor 712 of the (first) central carriage 5B is aligned within the rotor chamber 81 in parallel to the rotor channel 85 and can enter the rotor channel 85. This position is reached, when the central carriage 5B has entered the parking region and has contacted the end carriage 5A or when the third foldable element 13 has been removed from the parking region and has been turned back into alignment in parallel with the running rail 2. In the first case (entrance) the rotor 712 has not yet been turned within the rotor chamber 81. In the second case (exit) the rotor 712 has been turned in the rotor chamber 81 into the exit position, thereafter the central carriage 5B can exit. When the central carriages 5B are exiting, only the two first foldable elements 11, 12 are turned into alignment in parallel to the running rail 2, subsequently also the rotor 712 of the end carriage 5C can enter the rotor channel 85. The end carriage 5A and the related first foldable element 11 therefore show the same movements as the central carriage 5B and the related foldable elements 13 and 15. The significance of this is explained below with reference to FIG. 10.

FIG. 7 further shows the foot rail 4 from below with a guide channel 41 provided therein, in which guide wheels 53*f* of the bottom-sided carriages 5Af, 5Bf are guided. The bottom-sided carriages 5Af, 5Bf, which are mounted on the bottom side, are connected via connecting shafts 711*f* (see FIG. 9) with bottom-sided fittings 71*f* that are attached on the bottom side to the foldable elements 11, 12, 13. The bottom-sided fittings 71*f* are identical to the wall fittings 71 mounted on the ceiling side. The bottom-sided connecting shafts and the ceiling-sided connecting shafts 711*f*, which correspond to one another, are coaxially aligned with one another, so that proper function of the system with foldable elements 1 is ensured.

The connecting shafts 711 are connected via the fitting lever 713 to the foldable elements 11, . . . , 16, wherefore torques act on the foldable elements 11, . . . , 16, as soon as a manual force or a force generated by the drive unit 61 is exerted onto the foldable elements 11, . . . , 16 in parallel to the running rail 2. By the resulting torque the foldable elements 11, . . . , 16 are turned sequentially, as soon as the carriages 5A, 5B are stopped and the rotors 712 have entered the related rotor chambers 81. Before, turning of the foldable elements 11, . . . , 16 is prevented by the rotors 712 guided in the rotor channel and preferably by a guide cam 721 guided in stabilising rail 3 as described below with reference to FIG. 10.

FIG. 8 shows the system with foldable elements 1 with the stabilising rail 3 that comprises a plurality of passages 31, which provide access to the stabilising rail 3. It is further shown that on top 10 of the first and the third foldable elements 11, 13 each, a guide fitting 72 is mounted, which comprises a guide cam 721. Further, on top 10 of all foldable elements 11, 12, 13 and 14 each, a support bracket 73 is mounted, which comprises a support cam 731, with which the related foldable elements 11, 12, 13 and 14 can be fixed in the parking position.

When closing the system with foldable elements 1 the guide cams 721 are guided through the passage 31 into the stabilising channel 32 and are displaceably held therein. The support cams 731 are positioned in such a way, that they abut the outside of the stabilising rail 3, after the system with foldable elements 1 has been opened and preferably also after the system with foldable elements 1 has been closed. The stabilising channel 32 preferably comprises a U-profile which is opened downwards. Preferably a guide element 33 is provided, which guides the guide cam 721 towards the passage 31 and simultaneously lets the support cam 731 passe by. For this purpose the support cam 731 is for example embodied with smaller height than the guide cam 721. The guide cam 721 and the support cam 731 are preferably provided with rolls or gliding elements.

The process of entering the guide cam 721 mounted on top of the first foldable element 11 into the stabilising rail 3 is shown in FIG. 10.

The rotor shafts 712 are held in place within the related rotor chambers 81 in defined positions, but remain rotatable, so that the foldable elements 11, 12, 13, . . . , 16 are always guided along the same path when the system with foldable elements 1 is opened or closed. The guide cam 721 mounted on top 10 of the foldable elements 11, . . . , 16 therefore pass with each turning process through the related passage 31 provided in the stabilising rail 3. The constant distance between each rotor chamber 81 and the related passage 31 therefore corresponds to the constant distance between the rotor shaft 711R and the related guide cam 721.

FIG. 8 shows the rotors 712 of the carriages 5A, 5B in the alignment already shown in FIG. 7. The rotor 712 of the central carriage 5B is aligned in parallel to the rotor channel 85 and can enter into it. Hence, the central carriage 5B is unblocked and can exit, drawn from the third foldable element 13. Thereby the second foldable element 12 is following and thus turns via the hinge 19 the first foldable element 11 around the rotor shaft 711R, which is stationary held by the rotor 712 of the end carriage 5A. The first foldable element 11 therefore makes a turn until it is aligned in parallel to the running rail 2. As illustrated in FIG. 10, during this turning process the guide cam 721 passes through the related passage 31 and enters the stabilising rail 3. As soon as this is completed the rotor 712 of the end carriage 5A is aligned in parallel to the rotor channel 85 and can drive into it. Now, the end carriage 5A is also unblocked and is driving together with the first foldable element 11 preferably on a lock drive over a distance so far, until the guide cam 721 is securely held within the stabilising channel 32.

If the first foldable element 11 shall remain at the neighbouring wall, then the drive length of the end carriage 5A, i.e. the length of the lock drive is limited to a drive length, that is required for moving the related guide cam 721 away from the passage 31 and to secure the guide cam 721 within the stabilising channels 32. After completion of this process the first foldable element 11 is firmly held on the one hand by the end carriage 5A and on the other hand by the guide cam 721 which is mounted in the vicinity of the hinge 19, wherefore forces are neutralised that act on the trailing foldable element 11. This ensures that all foldable elements 11, . . . , 16 of the system with foldable elements 1 are optimally held and outer impacts are neutralised practicably completely.

When closing the system with foldable elements 1 the described processes are executed sequentially for each wall pair of foldable elements 11, 12; 13, 14 and 15, 16; which can freely be selected in number. For each wall pair a rotor chamber 721 is provided and preferably a passage 31 corresponding thereto in the stabilising rail 3. The running rail 2 can also be designed for a higher number of foldable elements, from which only a part is used.

When opening the system with foldable elements 1 the described processes run reverse. The rotor 712 of the carriage 5A or 5B is held in the related rotor chamber 81 and turned. The related guide cam 721 appears at the passage 31 and can exit the stabilising channel 32. The related foldable element 11, 13, 15 can no longer be displaced but turned and parked.

FIG. 9 shows the running rail 2 in different spatial views with three rotor chambers 81 provided therein. For the end carriage 5A and two central carriages 5B each a rotor chamber 81 is provided. All three rotor chambers 81 are occupied, then said three carriages 5A, 5B are parked adjacent to one another in the parking region.

FIG. 10 shows a running rail 2 in a preferred embodiment with a coupling member body 80 mounted therein, which laterally exhibits a coupling member 8 with three rotor chambers 81 and above two retaining grooves 84. The central member 203 of the running rail 2 comprises flange elements 24, which engage into the retaining grooves 84 and hold the coupling member body 80. Hence, between the flange elements 24 a mounting channel 86 is formed, into which one or more coupling member bodies 80 can be inserted and can be fixed in suitable positions for example with screws.

FIG. 11 shows a part of an inventive system with foldable elements, which merely comprises a front carriage 5*c* and an end carriage 5A as well as a coupling member body 80 without running rail 2. The end carriage 5A is provided with an asymmetrical rotor 712, which has entered and turned in the first rotor chamber 81. Due to the asymmetrical embodiment, the rotor 712 will not require space on the other side of the rotor channel 85.

Further, FIG. 11 symbolically shows a control unit 9 that is connected to an input device 95 and that is connected to the drive device 61 of the front carriage 5*c* via electrical lines 65, which serve for the transfer of data and/or electrical energy. Over these lines 65 data can be transferred from the drive device 61 to the control unit 9. If the drive device 61 comprises a processor, then the data transfer can be performed with a known protocol. Preferably, data, which are provided by Hall sensors of a direct-current motor as well as data, which indicate the actual value of the motor current, are transferred to the control unit 9. Other known devices use current bars for transferring data, which current bars are integrated in the running rail and are contacted with electrical contacts that are attached to the carriages. The inventive method and device can therefore be implemented with different electrical systems, which serve for driving the carriages and for transferring data.

The received data are processed by means of an operating program 900 provided in the control unit, in order to determine the currently acting load, which corresponds to the motor current, and related position data. Therefrom status data of the installed system with foldable elements 1 are gained, which are taken into account by the operating program 900 when operating the system with foldable elements 1, as this has been described above.

The operating program 900 is designed to determine and register the determined parameters of the system with foldable elements 1, such as the direction of opening the system with foldable elements 1, the number as well as the dimensions and the weight of foldable elements 11, . . . , 16 and to operate the system with foldable elements 1 accordingly. After recording the parameters of the system with foldable elements 1, the interface to the user is preferably configured as well, so that the user can select or enter commands that are adapted to the configuration of the system with foldable elements 1. For example, a suitable menu structure is provided, which allows controlling the system with foldable elements 1 accordingly.

In the event that malfunctions or status changes are detected, the control unit 9 can transfer corresponding messages via a communication line 901, e.g. via an Intranet or the Internet, to a maintenance server 90 that is operated by the system supplier for example. In preferred embodiments the maintenance server 90 can retrieve all required data from the control unit 9 or can even execute learning drives, in order to test the system with foldable elements 1.

With the input device 95 the user can control the system with foldable elements 1 and can enter additional operating parameters. The operating program 900 can take further information into account that is provided by sensors 91, 92. For example, by means of the sensors 91, 92 the position of the carriages 5 or the temperature of the electric motors 61 are monitored. Further, the control unit 9 can control further devices, e.g. an actuator 93 that serves as intermediate stop and that comprises an actuating member, such as a plunger, with which a carriage 5 can be stopped. As mentioned, the motorised carriage 5 can be stopped by means of the control unit selectively at any position, wherefore an intermediate stop is used in special cases only.

The system with foldable elements 1 can therefore be shifted selectively and can be parked and positioned as desired. With optimised acceleration profiles and breaking profiles it is possible to control the system with foldable elements efficiently and to avoid disturbing noises.

Figure 1:
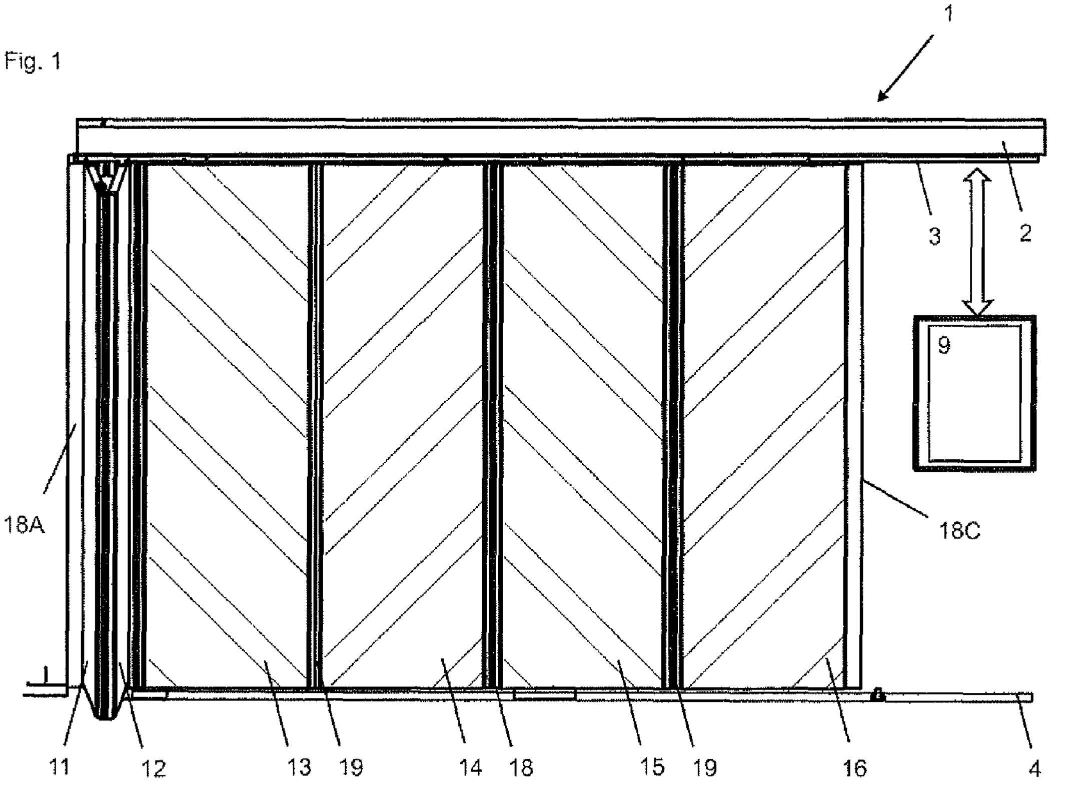
Figure 2:
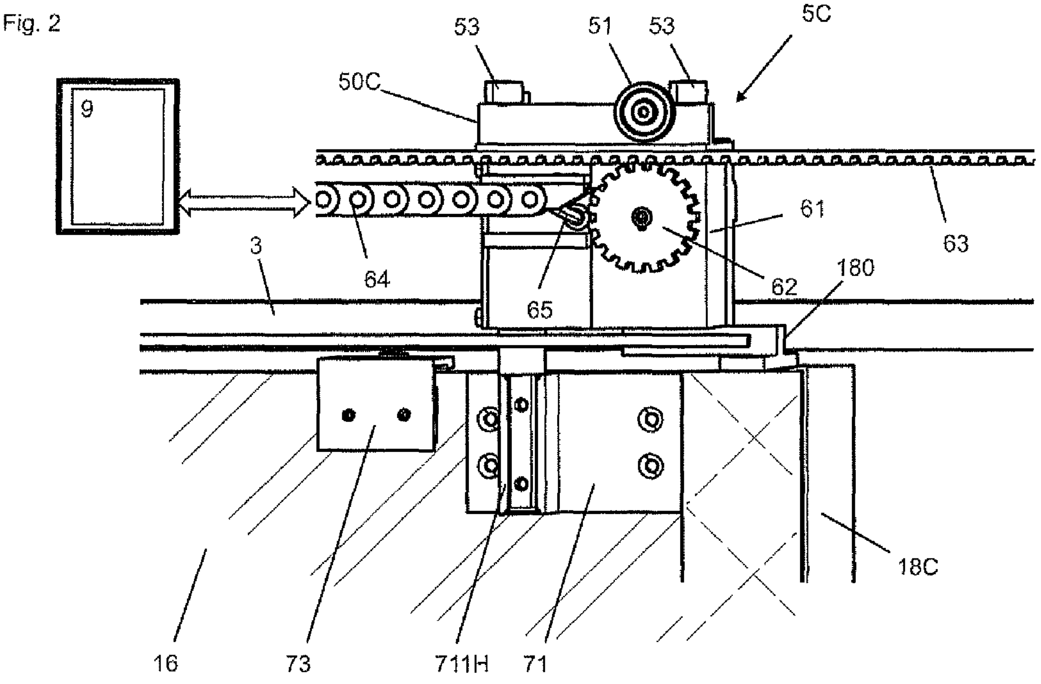
Figure 3:
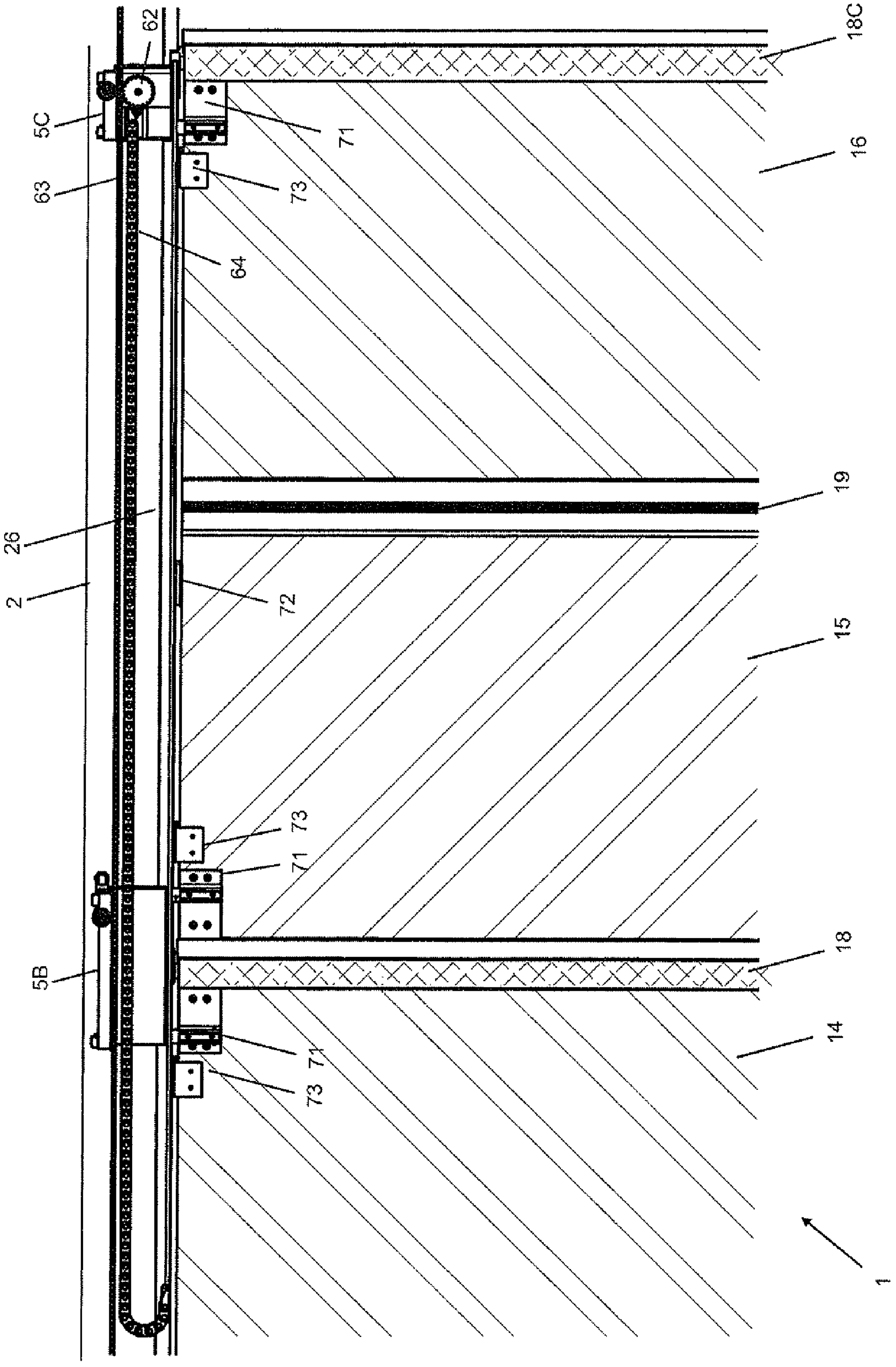

Depending on the drive direction, different information can be gained from the individual load profiles LV that can be used for the control and/or maintenance of the system with foldable elements 1. In particular, different parameters of the system with foldable elements 1 can be determined.

The diagrams show the distances that is traversed by the front carriage 5D. Depending therefrom, the profile LV of the motor current i that is recorded from the electric motor 61, or, respectively, the thereto corresponding load acting on the front carriage 5D is shown.

The position of the front carriage 5D is determined by measuring the turns of or fractions of turns of the drive shaft of the drive motor 61. A direct-current motor equipped with Hall sensors that can deliver data for fractions of a turn of the drive shaft, so that the position of the front carriage 5D can be determined with highest precision. In this way it is possible to determine the motor current i for each position of the front carriage 5D while performing the learning drive and later during normal operation. Subsequently, the actual data captured during normal operation can be compared with the expected data captured during the learning drive, e.g. in order to detect an obstacle.

The pairs of foldable elements 11, 12; 13, 14; 15, 16 can comprise different dimensions and can be manufactured from different materials and can therefore have different masses. With the analysis of the load profiles when opening and/or closing the system with foldable elements 1 information regarding the configuration of the system with foldable elements 1 as well as regarding the properties of the individual foldable elements 11; 12; . . . can be determined. The points P1, P2, P3 in the diagram of FIG. 12 indicate the positions in the load profile, at which always a pair of foldable elements 11, 12; 13, 14 or 15, 16 has been seized and driven out of the parking region. Hence, at the mentioned positions P1, P2, P3 significant load changes have occurred. The distance between the positions P1, P2, P3 therefore corresponds to the width of the related pair of foldable elements 11, 12; 13, 14 or 15, 16. The width of each foldable element 13, 14, . . . can therefore precisely be determined. The control unit 9 can therefore register the distances, which needs to be traversed in order to drive a specific foldable element 11, . . . , 16 in or out of the parking region.

Further, it is registered that the occurring load is continuously increasing during the drive in the selected direction, wherefore the control unit 9 registers, that the system with foldable elements 1 is closed during the drive in this direction. The control command for a drive in this direction is therefore coupled by logic with the corresponding input element, e.g. the related menu point "CLOSE".

In the diagram to each pair of foldable elements 11, 12; 13, 14 or 15, 16 a load profile p13-14 or p15-16 is assigned that comprises a first and a second profile section pa1 or pa2. The first profile section pa1 represents the constant load share for the related foldable element 15 that is mainly caused by sliding friction occurring in the carriages 5.

The second profile section pa2, which occurs together with load changes, represents the energy required for accelerating the related foldable element 11, . . . , 16. After termination of the relatively short acceleration phase, a force required for acceleration is no longer present. Measurement of the area of the second profile sections pa2 allows determining the masses of the related pairs of foldable elements 11, 12; 13, 14 or 15, 16. The load acting on the drive device continuously increases when unfolding the pairs of foldable elements 15, 16, until the next pair of foldable elements 13, 14 is released. Hence, when closing the system with foldable elements 1 different forces are superimposed upon one another, wherefore the properties of the foldable elements 11, 12; 13, 14 or 15, 16 are determined preferably by analysing the load profile that is recorded when opening the system with foldable elements 1.

Figure 4A:
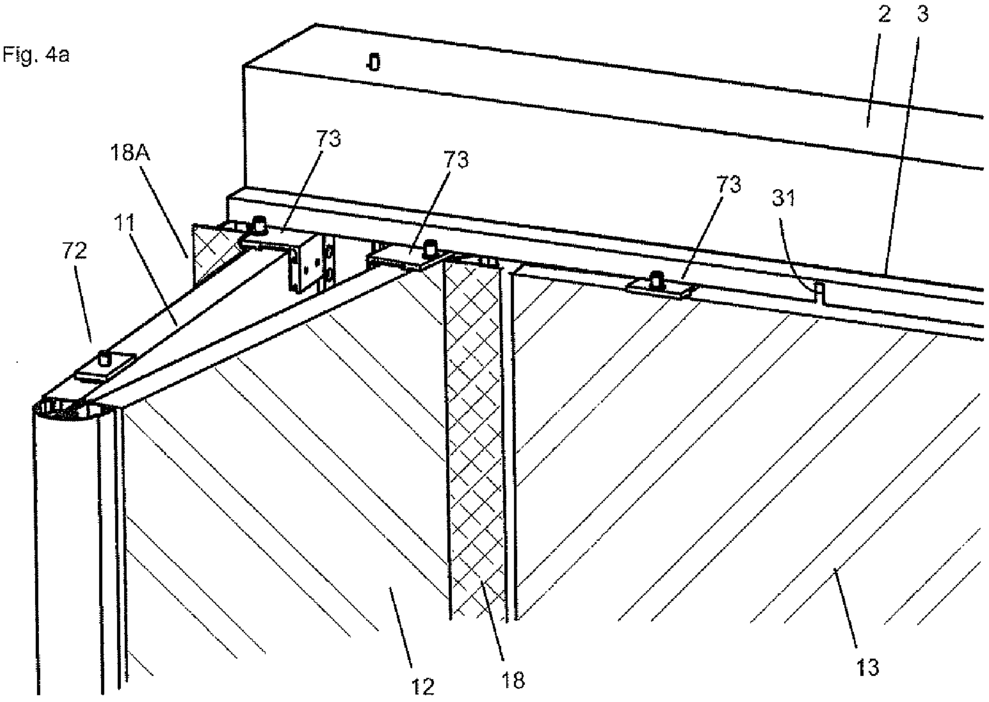
Figure 13:
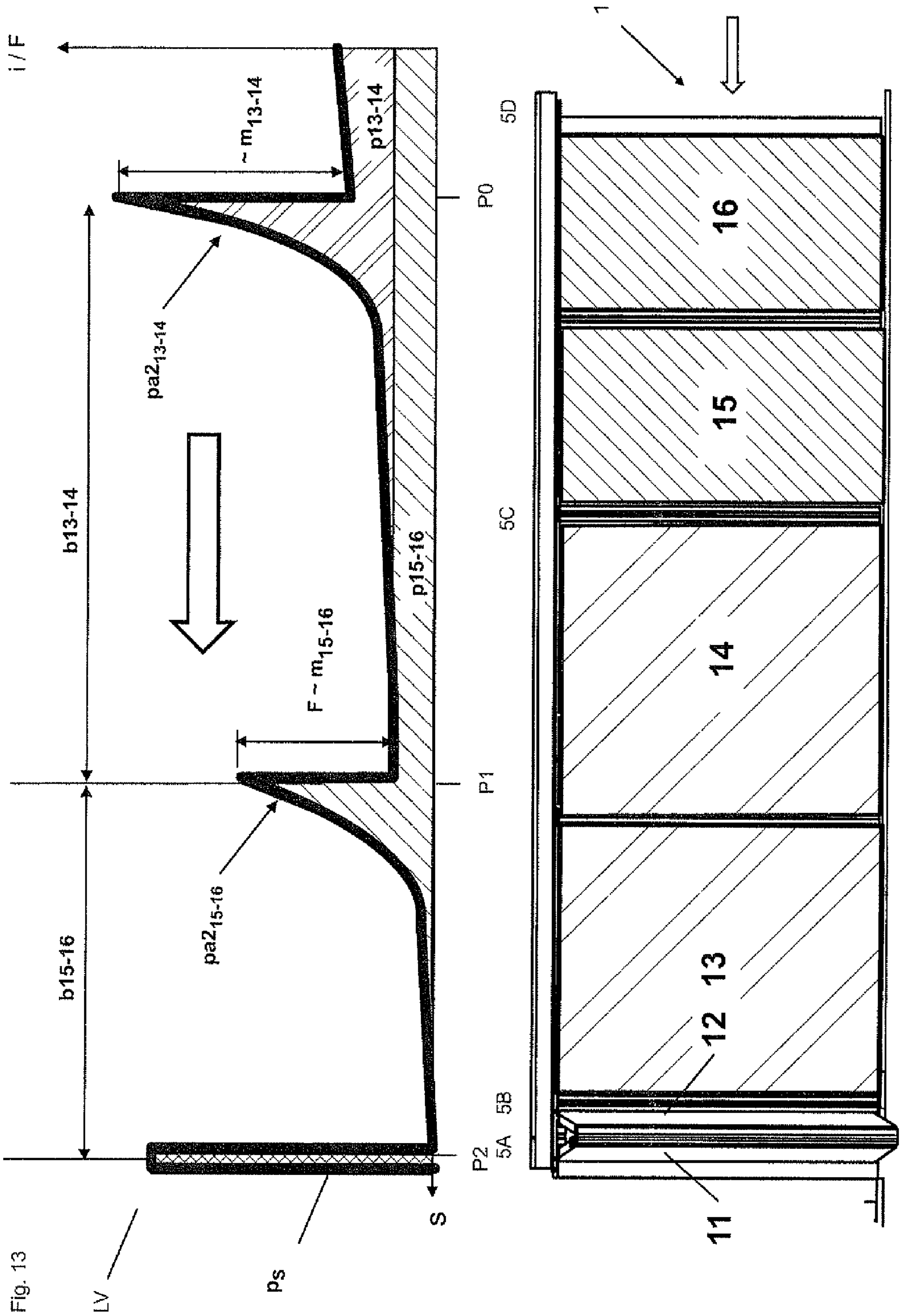
FIG. 13 shows a load profile LV recorded while opening the system with foldable elements 1 of FIG. 1 with a load changes Lw1, Lw2, . . . that occur when turning the foldable elements 11, 12, . . . in the parking region.

The load profile LV shown in FIG. 13 that has been recorded when opening the system with foldable elements 1, exhibits significantly higher load peaks that occur at positions P0 and P1, at which the pairs of foldable elements 13, 14 and 15, 16 are stopped and turned approximately by 90° into the position shown e.g. in FIG. 4*a*.

Figure 6:
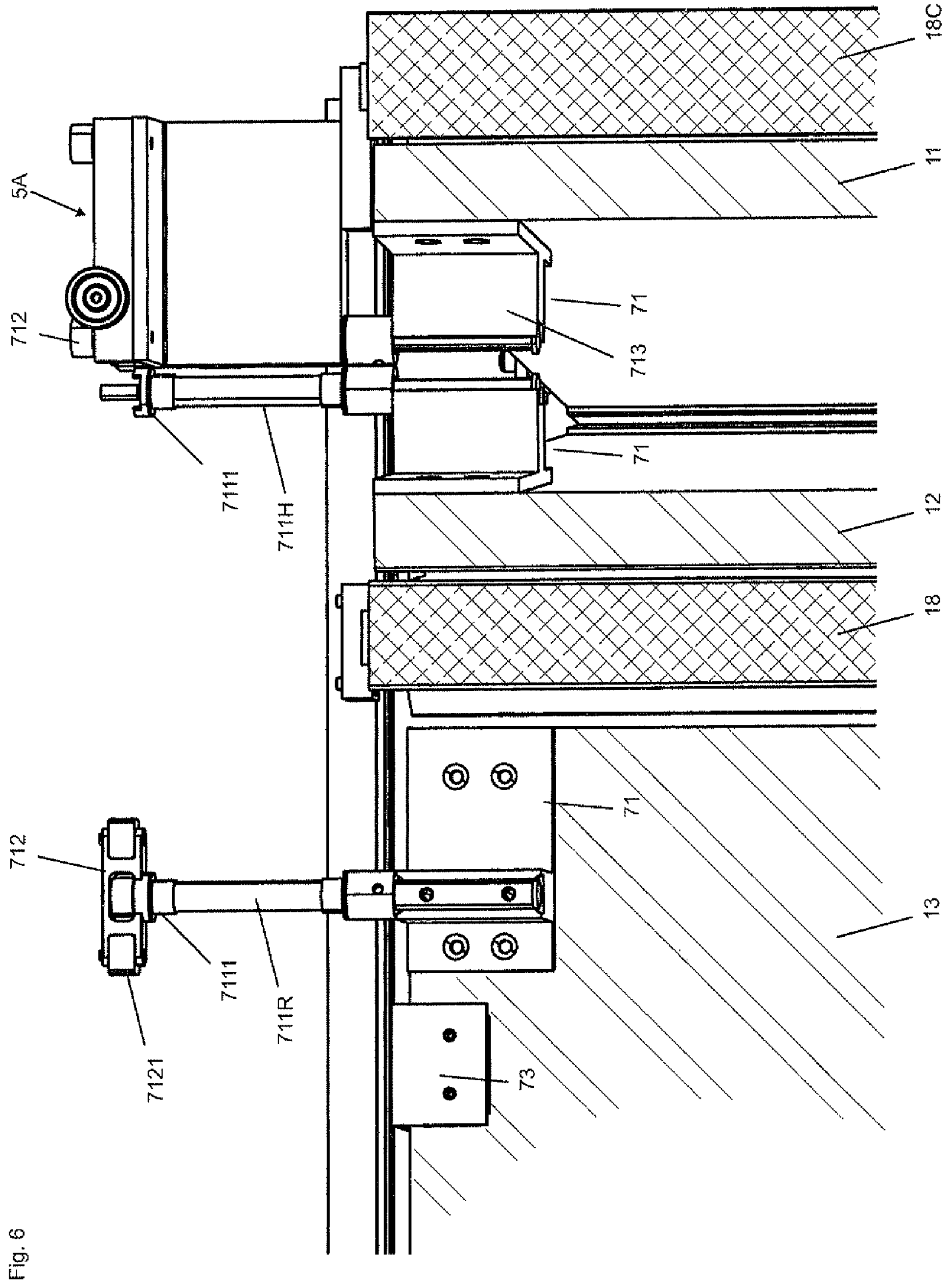
Figure 7:
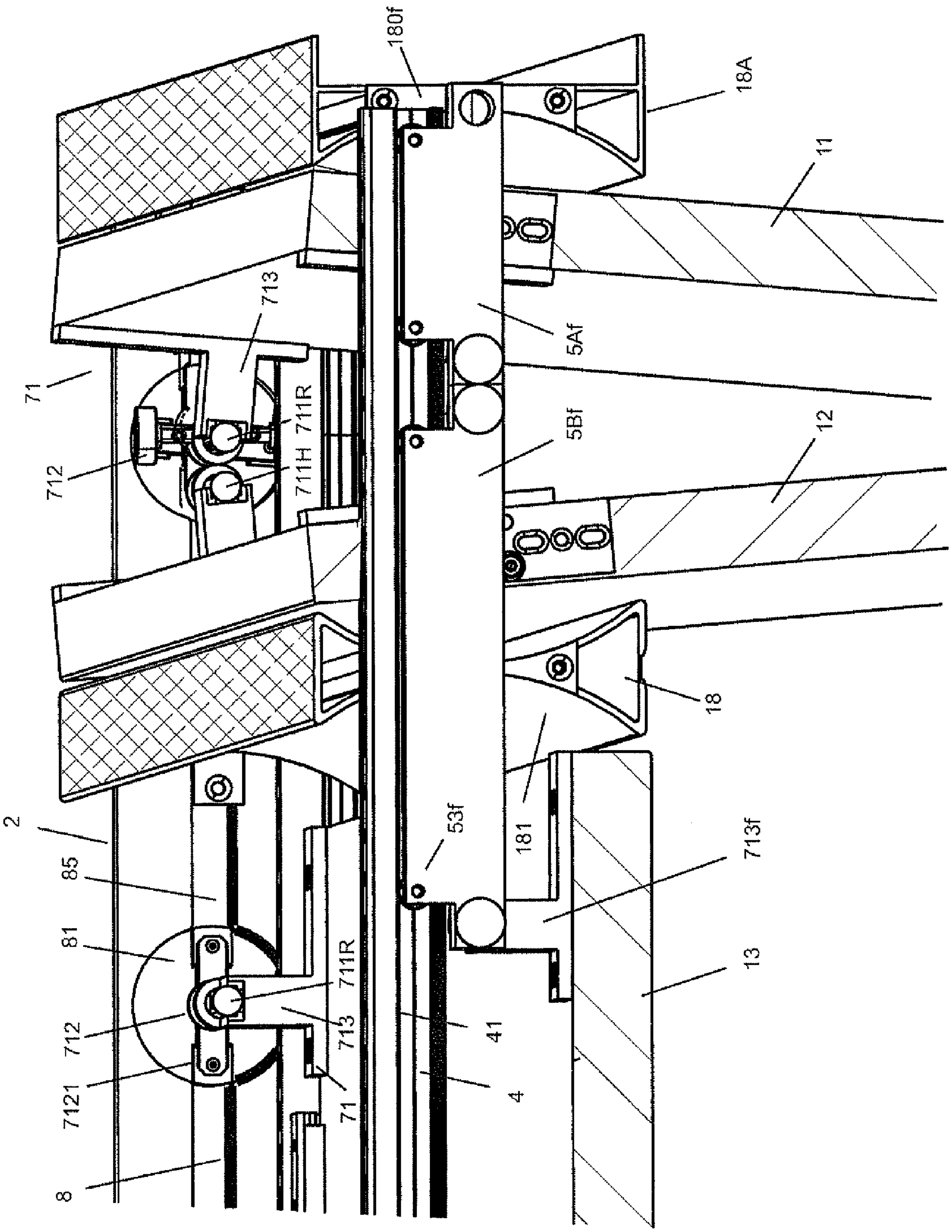
Figure 8:
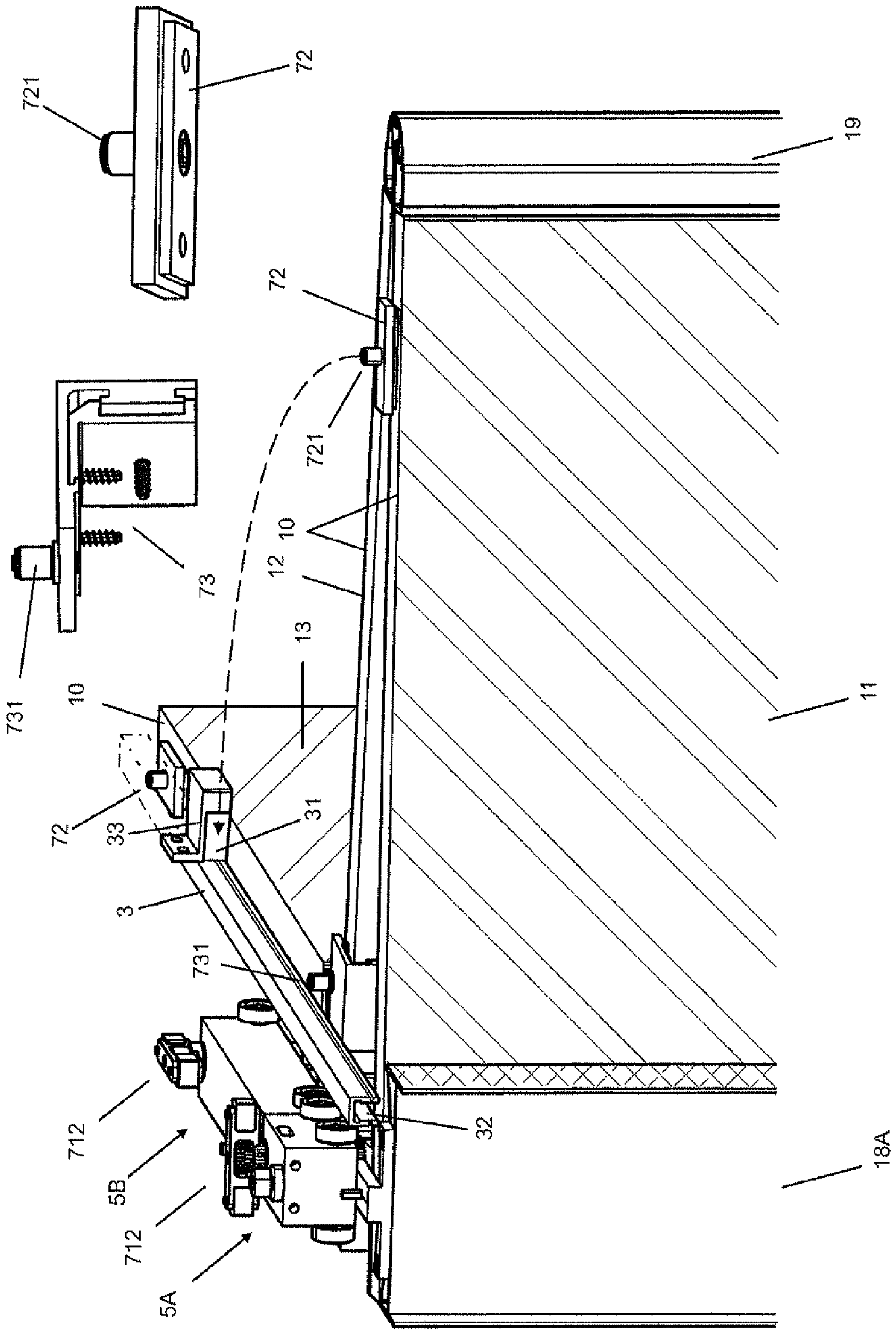
Figure 9:
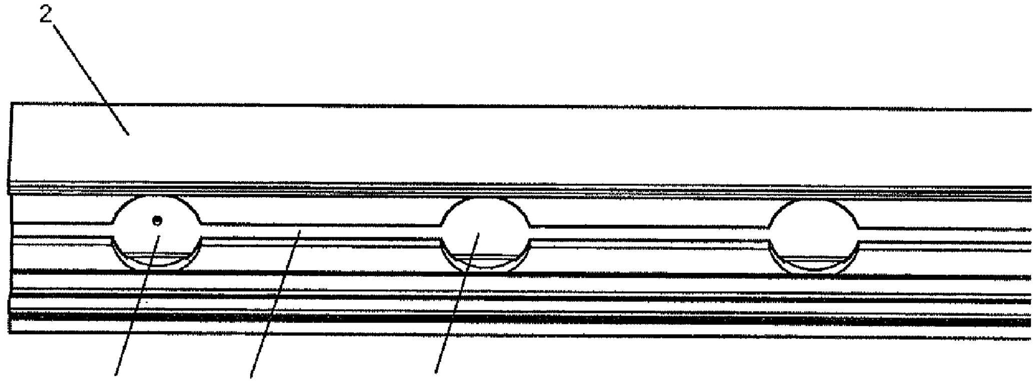
Figure 10:
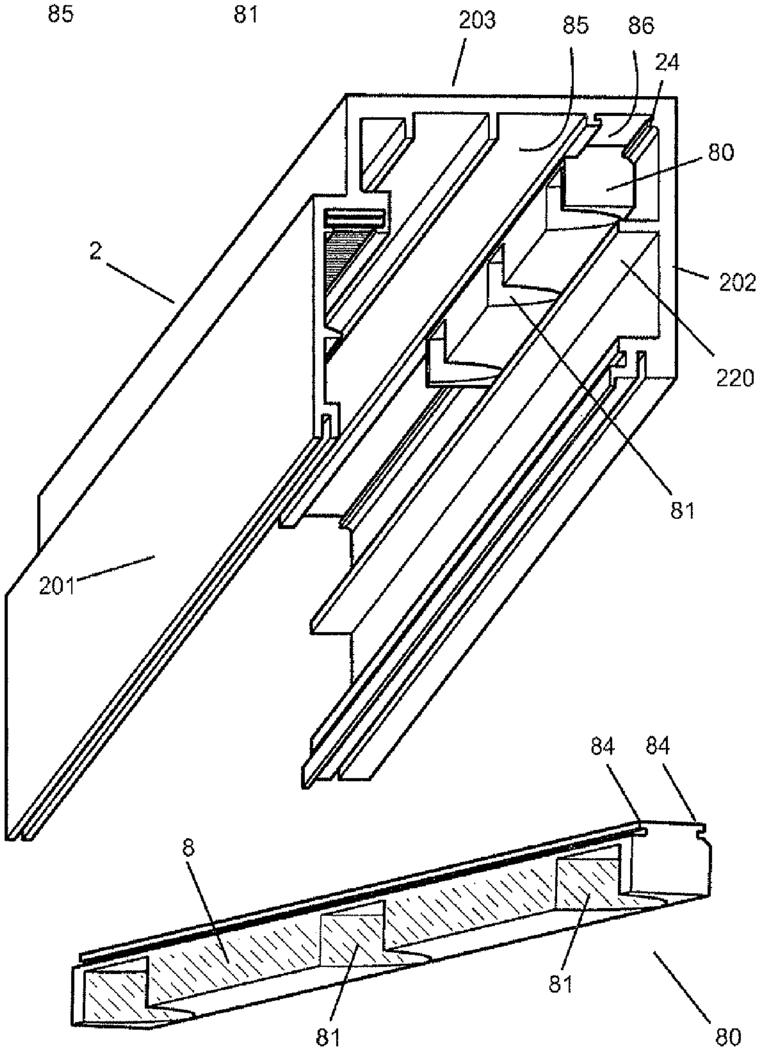

For the process of opening the system with foldable elements 1 it is required that a torque can be applied to the foldable elements 11, 12; 13, 14 or 15, 16 which are required to be turned. For this purpose the foldable elements 11, 12, . . . are mounted in a distance from the turning point, which is reached with a fitting lever 713 provided on the wall fitting 71, as shown in FIG. 6. In view of the small length of the fitting lever 713, a high force is required when opening the system with foldable elements 1 in order to generate the required torque. The height of the force F is proportional to the mass of the foldable elements 11, 12, therefore when opening the system with foldable elements 1 larger measurement values can be captured that allow determining the mass of the foldable elements 11, 12, . . . precisely.

In FIG. 13 it can be observed that the load profile LV has been recorded from right to left starting from the state of the system with foldable elements 1 shown. The system with foldable elements 1 is still in motion; the foldable elements and 12 have been folded completely while the further foldable elements 13, 14 and 15, 16 close a part of the opening and are aligned in a plane for this purpose. The motorised front carriage 5D is positioned closely in front of the position P0 and is driven towards position P2, while the motor current i or the load F, respectively, is measured.

Figure 4B:
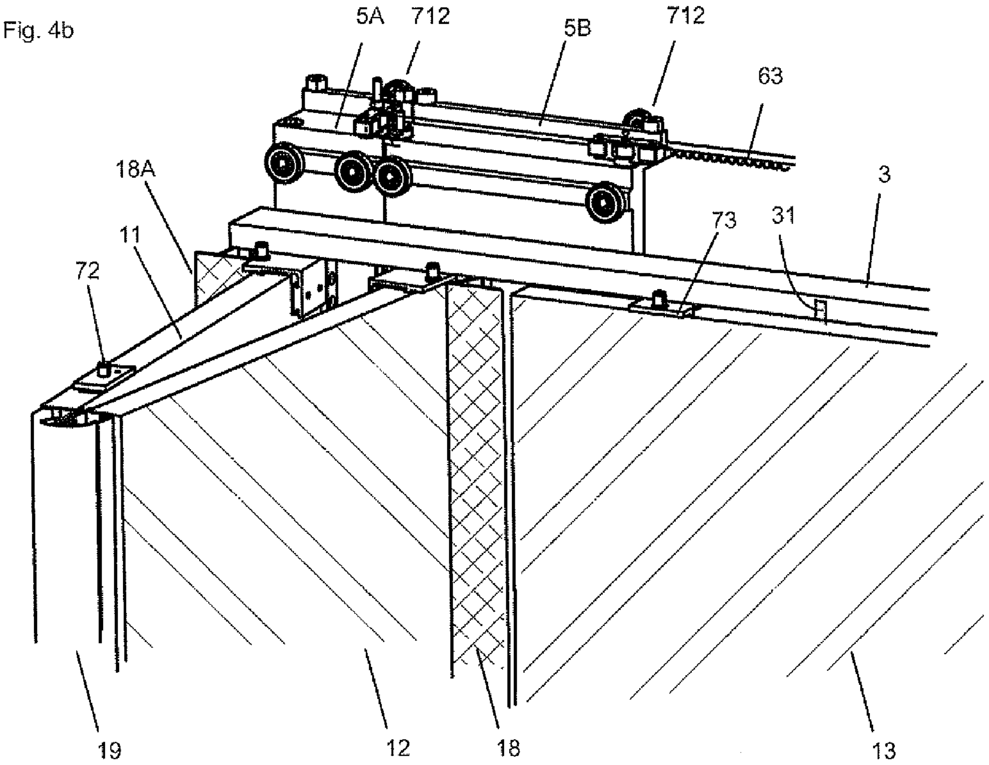
Figure 5A:
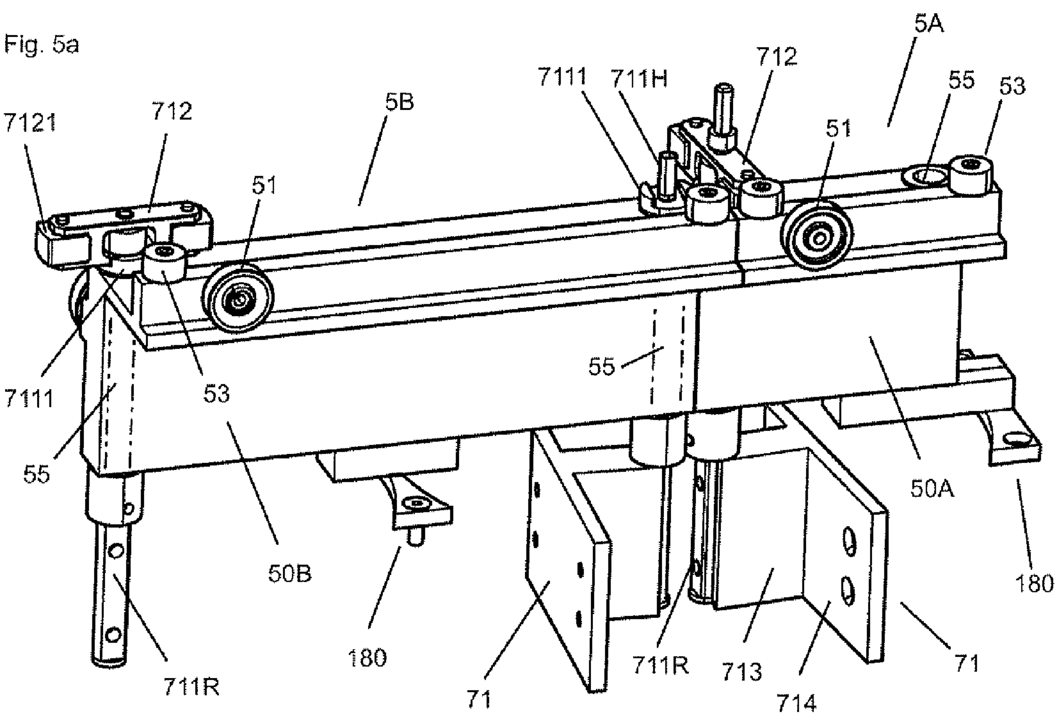
Figure 5B:
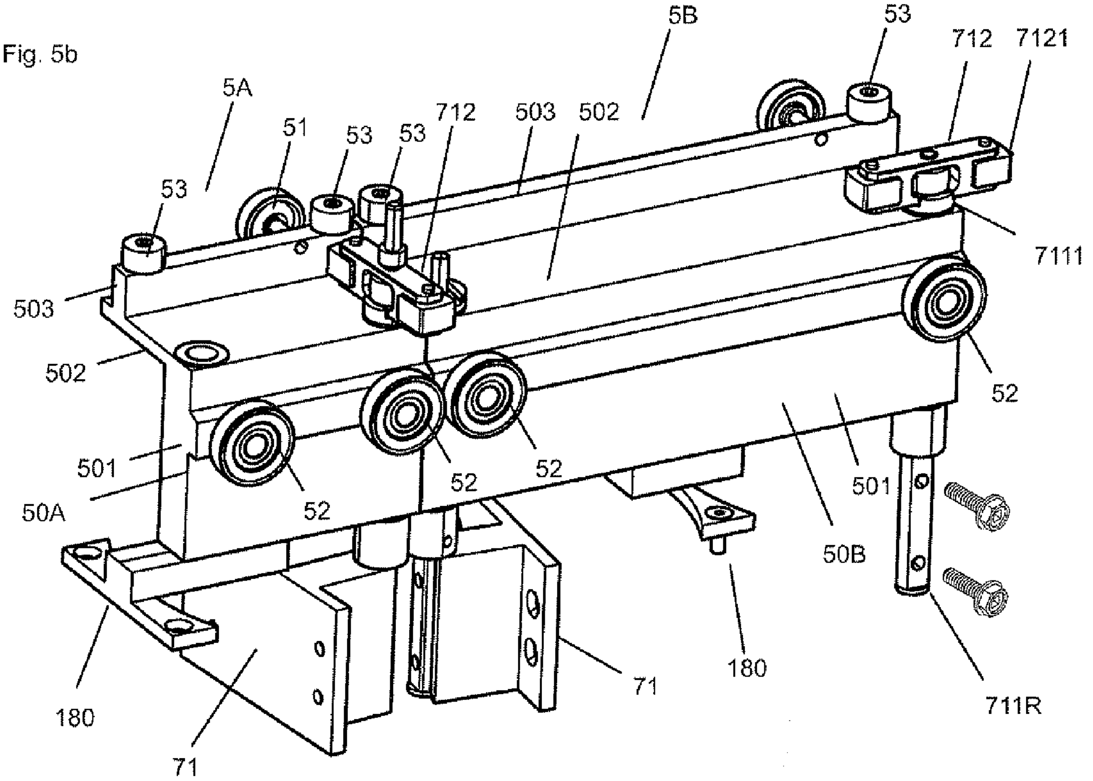

As FIG. 4*b* shows, carriage 5B of the foldable element 13 hits the first carriage 5*a* as soon as the front carriage 5D reaches position P0. With a further impact of force, no further movement, but a turning of the foldable elements 13 and 14 results. Turning of the foldable element 13 is possible, since the rotor 712 of carriage 5B has reached the related rotor chamber in the running rail and can turn therein.

At the beginning of turning, in view of the small active lever, maximal force needs to be applied. While turning the already accelerated foldable elements 13, 14 the lever is continuously increasing so that the required force rapidly decreases. Friction losses of the parked carriage 5*b* are disappearing, wherefore the force required for the foldable elements 13 and 14 approaches zero. After the foldable elements 13, 14 have been folded completely, the carriage 5C of foldable element 15 hits carriage 5B, so that the foldable elements 15 and 16 can no longer be moved, but can only be turned. Subsequently, again, a high force needs to be applied that corresponds to the mass of the foldable elements 15 and 16 and that decreases rapidly with turning of the foldable elements 15 and 16. In the simplified diagram, friction losses of the front carriage 5D and the impact of wind onto the foldable elements are not taken into account. With the analysis of the load profile LV it can also be examined whether external influences are present. In such a case a repetition of the learning drive can automatically be ordered.

The load profile LV recorded during the learning drive exhibits at its end a further increase $p_s$ of the current, which occurs, when the front carriage 5D hits the preceding carriage 5C. As soon as the increase of current $p_s$ exceeds a specified threshold, then the drive is switched off. Based on the determined data obtained during the learning drive the control unit can subsequently detect, whether the front carriage 5D has reached a position P2, and can switch of the drive. A collision with the preceding carriage 5C can therefore be avoided.

By determining said information it is possible to select adapted parameters for the operation of the system with foldable elements 1 and to adapt acceleration profiles and breaking profiles accordingly in order to avoid wear off of the device parts.

Figure 12:
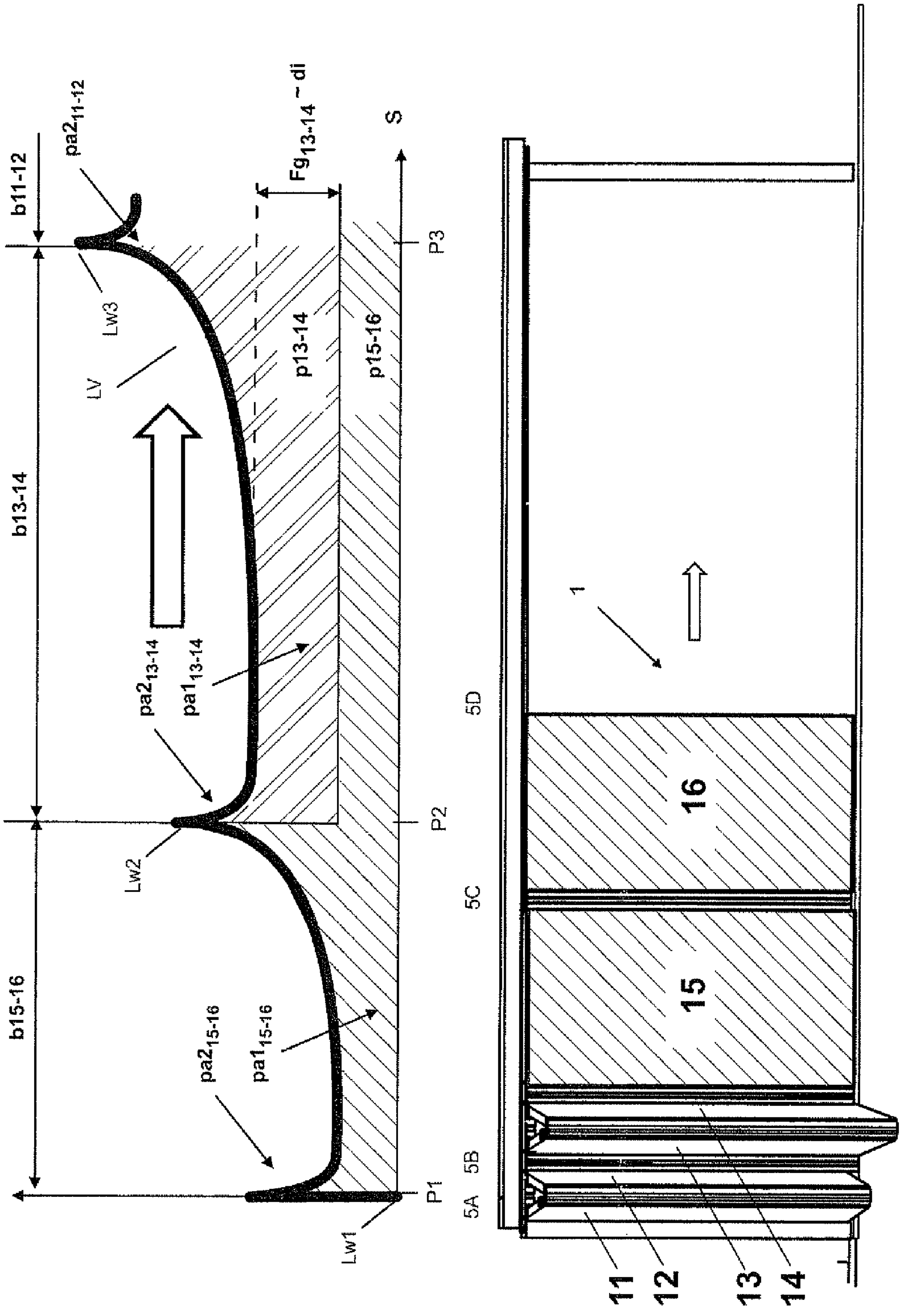
FIG. 12 shows a load profile LV recorded while closing the modified system with foldable elements 1 of FIG. 1 with a plurality of load changes Lw1, Lw2, . . . , that always occur when a foldable element 16, 15, 14, . . . is accelerated.

The first profile section pa1 is particularly relevant in view of determining the operational state of the carriages 5. If one of the carriages 13, 14 exhibits higher friction losses, then the related load share increases, as shown in the diagram. In the diagram of FIG. 12 a higher force relating to sliding friction $Fg_{13-14}$ is registered that allows the conclusion that, e.g. caused by a higher weight of the foldable elements 13 and 14 a wear off of the bearings has occurred and that the carriage should be replaced.

Hence, from the diagram not only the configuration, but also the operational state of the system with foldable elements 1 can advantageously be read. The determined configuration data allow the control unit 9, to configure and operate the system with foldable elements 1 according to the recommendations of the supplier and adapted to the properties of the system. The status data allow detection and target oriented correction of deficiencies of the system with foldable elements 1.

Figure 11:
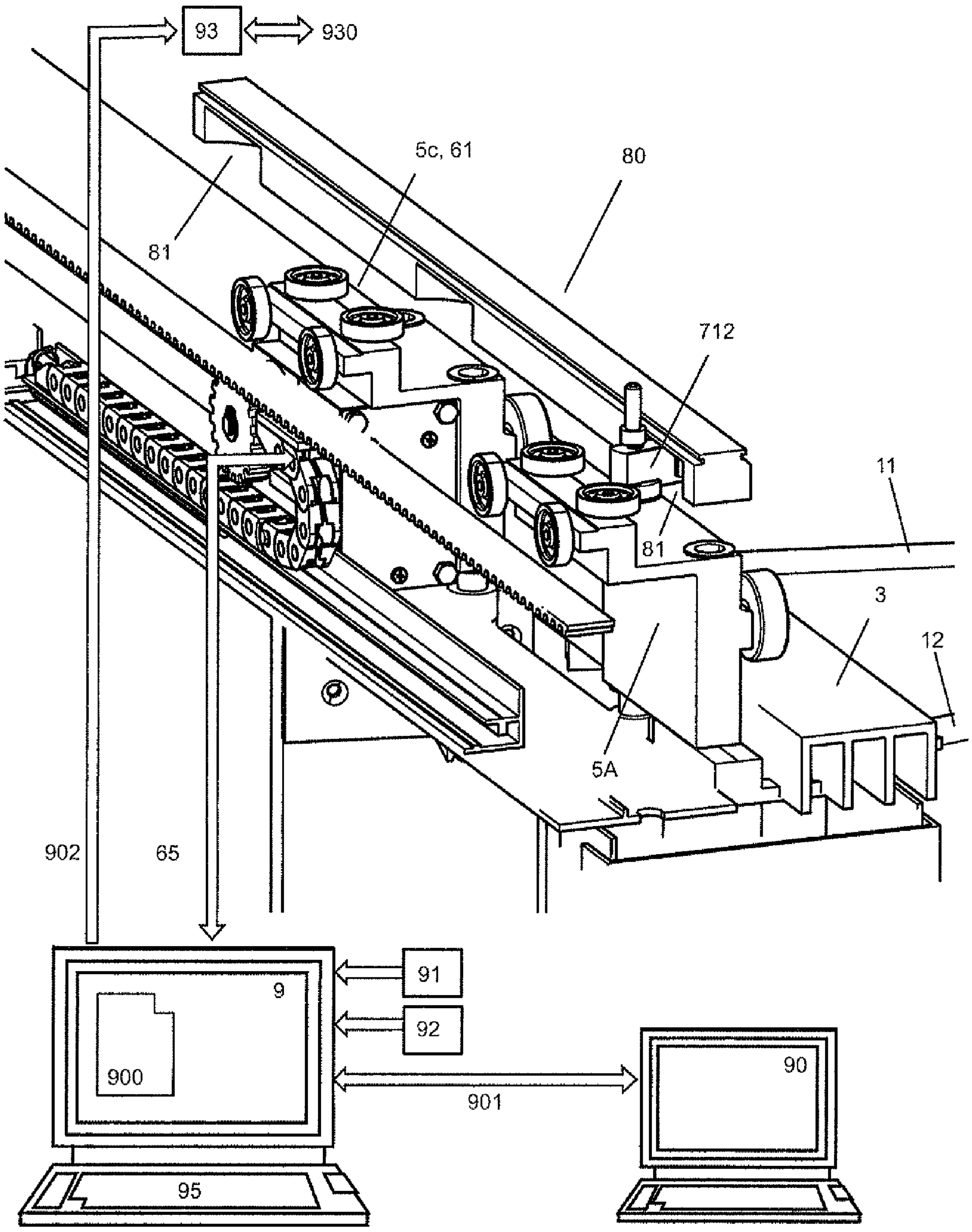

Preferably, the control unit 9 is provided with a radio frequency interface, with an interface for a wired network or a data bus, over which the maintenance server 90 shown in FIG. 11 can be connected to the system with foldable elements 1.

LITERATURE

[1] U.S. Pat. No. 6,286,258B1 (WO 97/49885)
[2] Product catalogue of HAWA AG, "Baubeschläge für Schiebeläaden", 2006
[3] US2010154174A1 (EP2199514B1)
[4] U.S. Pat. No. 6,005,361A (DE19601359A1)
[5] Application Note, Rev. 2596B-AVR-02/06 der Atmel Corporation

| List of reference numerals | |
|---|---|
| 1 | system with foldable elements, particularly foldable sliding wall |
| 10 | top of the foldable elements 11-16 |
| 11-16 | foldable elements, particularly wall elements |
| 18 | protection profile |
| 18A, 18C | terminating profile |
| 180, 180f | profile holder |
| 19 | hinge profile |
| 2 | running rail |
| 201 | first side member of the rail 2 |
| 202 | second side member of the rail 2 |
| 203 | central member of the rail 2 |
| 21 | first carrier channel |
| 210 | supporting and holding element |
| 22 | second carrier channel |
| 220 | support element |
| 23 | guide channel |
| 24 | retaining grooves |
| 25 | mounting channel for the toothed belt 63 |
| 26 | traction channel |
| 3 | stabilising rail |
| 31 | passage |
| 32 | stabilising channel |
| 33 | guide element |
| 4 | foot rail |
| 41 | guide channel in the foot rail 4 |
| 5A | end carriage |
| 5Af | bottom-sided end carriage |
| 5B | central carriage |
| 5Bf | bottom-sided central carriage |
| 5C | front carriage |
| 5Cf | bottom-sided front carriage |
| 50A, 50C | bodies |

-continued

| List of reference numerals | |
|---|---|
| 501 | vertical first profile section |
| 502 | horizontal second profile section |
| 503 | vertical third profile section |
| 51 | first carriage wheels |
| 52 | second carriage wheels |
| 53 | guide wheels |
| 55 | bores for receiving connecting shafts 711 |
| 61 | drive motor in the front carriage 5C |
| 62 | drive wheel |
| 63 | toothed belt |
| 64 | cable chain |
| 65 | supply lines for power and, if necessary, data |
| 71 | wall fitting |
| 711 | connecting shaft |
| 711R | rotor shaft |
| 711H | holding shaft |
| 7111 | holding flange |
| 712 | rotor |
| 7121 | rotor head |
| 713 | fitting lever |
| 714 | fitting leave |
| 72 | guide fitting |
| 721 | guide cam |
| 73 | support bracket |
| 731 | support cam |
| 74 | guide element |
| 8 | coupling member |
| 80 | coupling member body (removable or integrated) |
| 81 | rotor chamber |
| 85 | rotor channel |
| 86 | mounting channel for holding the coupling member body |
| 9 | control unit |
| 90 | maintenance server |
| 900 | operating program |
| 901-903 | electrical lines |
| 91, 92 | sensors |
| 93 | intermediate stop with actuator |
| 930 | plunger of the actuator |
| 95 | input device |

The invention claimed is:

1. Method for initializing a foldable sliding wall, that is provided with a control unit and that comprises at least two foldable elements that are connected each via vertically aligned connecting shafts to related carriages, which are slidably supported in a horizontally aligned running rail and of which a front-sided carriage, which is connected to a front-sided foldable element, is provided with a drive motor, on which a load of the foldable elements is acting, the method comprising the steps of:

executing a learning drive, in which the front-sided carriage is transferred from a first end position to a second end position along said running rail;

capturing a load profile while executing said learning drive:

(i) by measuring a motor current that is supplied to the drive motor, said motor current corresponding to the acting load, and (ii) by measuring related position data for the front-sided carriage;

analysing the captured load profile and detecting changes of the load that occurred during the learning drive;

determining status data for the foldable sliding wall based on the detected changes of the load:

(i) by determining that the foldable sliding wall has been closed if an increase of said motor current across said load profile over its entire length has been detected, (ii) by determining that the foldable sliding wall has been opened if a decrease of said motor current across said load profile over its entire length has been detected, and (iii) by determining a related number of the foldable elements present in the foldable sliding wall based on the number of load changes that have been detected over the entire length of said load profile; and forwarding the status data to an operating program, that, when equipped with the status data, controls the drive motor depending on the determined status data.

2. Method according to claim 1, wherein reference values for a self-learning control system are determined, with which the drive motor is controlled.

3. Method according to claim 1, wherein the motor current and related position of the front sided carriage are recorded during operation and are compared with the determined status data in order to determine deviations, based on which the drive motor is controlled.

4. Method according to claim 1, comprising the step of detecting the number of load changes within said load profile and the distances between the detected load changes and determining a width of the foldable elements.

5. Method according to claim 1, wherein for at least one pair of foldable elements a first profile section is recorded, which represents the load during a linear movement of the pair of folding elements and/or wherein for at least one pair of foldable elements a second profile section is recorded, which represents the load during turning of the foldable elements.

6. Method according to claim 1, wherein load changes are registered for an impact of the end carriage on the final stop or on an intermediate stop, which can be activated, in order to determine related end positions or intermediate positions.

7. Method according claim 1, wherein based on the determined status data a self-configuration of the system with foldable elements is performed.

8. Method according to claim 7, wherein the system with foldable elements is operated under an additional control by inputs provided by the user, wherein the opening and closing of the system with foldable elements is selectable up to an end stop or to an intermediate stop or up to a folding or unfolding of a selected number of folding elements.

9. Method according to claim 8, wherein under consideration of the position data of the end stops or the intermediate stops and the mass of the foldable elements courses of acceleration and deceleration of the system with foldable elements are calculated and implemented.

10. Method according to claim 1, wherein during the operation of the system with foldable elements or during further learning drives new status data are gathered and are compared with previously recorded status data in order to detect status changes or disturbances, and if appropriate to report these status changes or disturbances to a maintenance server.

11. Method according to claim 1, wherein the control unit is executing, initialized automatically or manually, a learning drive after the installation of the system with foldable elements and data obtained during the learning drive are stored in a buffered memory, before the system with foldable elements is changed to an operational mode.

12. Method according to claim 1, wherein the control unit periodically stores a running time or a running distance of the system with foldable elements, and that the control unit generates a service request if a predetermined running time or running distance of the foldable sliding wall has been reached.

13. Method according to claim 1, wherein for determining the load a thereto proportional amplitude of the motor current supplied to the drive motor is measured and/or wherein for determining a driven distance and positions of the load changes a number of turns of a gearbox shaft, a number of turns of a gear wheel, a number of turns of a wheel of the drive carriage or a number of turns of the motor shaft, is measured with sensors.

14. System with foldable elements with a control unit operating according to a method as defined in one of the claim 1 and at least two foldable elements that are connected each via connecting shafts with related carriages, that are slidably supported in a running rail and of which a carriage that is connected to a front-sided foldable element is provided with a drive motor.

15. System with foldable elements according to claim 14, wherein the control unit is connected wireless or wired, over an Internet, an Intranet or a bus system with an external data processing unit, which receives determined status data.

* * * * *